United States Patent [19]
Espindola et al.

[11] Patent Number: 6,128,427
[45] Date of Patent: Oct. 3, 2000

[54] ARTICLES AND SYSTEMS COMPRISING DIGITALLY TUNABLE OPTICAL GRATINGS

[75] Inventors: Rolando Patricio Espindola, Chatham; Sungho Jin, Millington; Hareesh Mavoori, Berkeley Heights, all of N.J.

[73] Assignee: Lucent Technologies Inc., Murray Hill, N.J.

[21] Appl. No.: 09/141,906

[22] Filed: Aug. 28, 1998

[51] Int. Cl.[7] .................................................. G02B 6/26
[52] U.S. Cl. .............................. 385/37; 385/24; 385/147
[58] Field of Search .......................... 385/37, 24, 57, 385/6, 147

[56] References Cited

U.S. PATENT DOCUMENTS

| | | | |
|---|---|---|---|
| 5,781,677 | 7/1998 | Jin et al. | 385/37 |
| 5,999,546 | 12/1999 | Esindola et al. | 372/20 |
| 5,999,671 | 12/1999 | Jin et al. | 385/37 |

*Primary Examiner*—Hung N. Ngo
*Attorney, Agent, or Firm*—Mathews, Collins, Shepherd & Gould, P.A.

[57] ABSTRACT

The invention discloses digitally tunable optical grating device using force between switchable and nonswitchable magnets to reconfigure the mechanical strain, preferably a tensile strain, or gratings so that a pulse or short-duration current can induce a latchable change in grating periodicity. Preferred embodiments include fiber gratings with magnet gaps dimensioned for limiting the maximum strain applied to the grating and guides for providing strain without rotation or twisting. The magnets provide an accurately predetermined amount of strain and hence provide a latchable wavelength shift in the grating with a minimal amount of electrical power. The device is especially useful in WDM communication systems, particularly for adding or dropping channels and for dynamically equalizing amplifier gain.

9 Claims, 7 Drawing Sheets

ARTICLES AND SYSTEMS COMPRISING DIGITALLY TUNABLE OPTICAL GRATINGS

FIELD OF THE INVENTION

The present invention relates to magnetically reconfigurable optical grating devices and to communication systems using them. In particular, it concerns devices and systems including optical fiber gratings, the wavelength of which can be digitally tuned between preset values.

BACKGROUND OF THE INVENTION

Optical gratings are useful in controlling the paths or properties of traveling light. Of various types of gratings, those formed in optical fibers are of particular interest as they are key components in modern telecommunication systems. Basically, optical fibers are thin strands of glass capable of transmitting an optical signal containing a large amount of information over long distances with very low loss. The optical fiber is a small diameter waveguide comprising a core having a first index of refraction surrounded by a cladding having a second (lower) index of refraction. Typical optical fibers are made of high purity silica with minor concentrations of dopants to control the indices of refraction.

Optical gratings are important elements for selectively controlling specific wavelengths of light within optical communication systems. Such gratings include Bragg gratings, long period gratings and diffraction gratings. Such a grating typically comprises a body of material and a plurality of substantially equally spaced optical grating elements such as index perturbations, slits or grooves. Reconfigurabilty would be highly useful in all types of gratings.

A typical Bragg grating comprises a length of optical fiber, including a plurality of perturbations in the index of refraction substantially equally spaced along the fiber length. These perturbations selectively reflect light of wavelength $\lambda$ equal to twice the spacing $\Lambda$ between successive perturbations times the effective refractive index, i.e. $\lambda=2n_{eff}\Lambda$, where $\lambda$ is the vacuum wavelength and $n_{eff}$ is the effective refractive index of the fundamental mode. The remaining wavelengths pass essentially unimpeded. Such Bragg gratings have found use in a variety of applications including filtering, adding and dropping optical signal channels, stabilization of semi-conductor lasers, reflection of fiber amplifier pump energy, and dispersion compensation.

Bragg gratings are conveniently fabricated by doping a fiber core with one or more dopants sensitive to ultraviolet light, e.g., germanium or phosphorous, and exposing the core at spatially periodic intervals to a high intensity ultraviolet light source, e.g., an excimer laser. The ultraviolet light interacts with the photosensitive dopant to produce long-term perturbations in the local index of refraction. The appropriate periodic spacing of perturbations can be obtained by use of a physical mask, a phase mask, or a pair of interfering beams.

A difficulty with conventional Bragg gratings is that they filter only a fixed wavelength. Each grating selectively reflects only light in a narrow bandwidth centered around $\lambda=2n_{eff}\Lambda$. However in many applications, such as wavelength division multiplexing (WDM, especially dense WDM), it is desirable to have a reconfigurable grating whose wavelength response can be controllably altered.

One attempt to make a tunable waveguide grating uses a piezoelectric element to strain the grating. See Quetel et al., 1996 *Technical Digest Series*, Conf. on Optical Fiber Communication, San Jose, Calif., Feb. 25–Mar. 1, 1996, Vol. 2, p. 120, paper No. WF6. The difficulty with this approach is that the strain produced by piezoelectric a actuation is relatively small, limiting the tuning range of the device. Moreover, it requires a continuous application of electrical power with relatively high voltage (approximately 100 volts).

U.S. patent application Ser. No. 08/791,081 filed by Jin et al. on Jan. 29, 1997, and U.S. patent application Ser. No. 09/020,206, filed Feb. 6, 1998, both describe magnetically tunable optical fiber gratings including devices that are wavelength tunable and latchable by magnetic force. The tensile force in the fiber grating introduced by attractive or repulsive force between magnetic components alters the spacing between perturbations and hence the grating wavelength.

Long-period fiber grating devices provide wavelength dependent loss and may be used for spectral shaping. A long-period grating couples optical power between two copropagating modes with very low back reflections. A long-period grating typically comprises a length of optical fiber wherein a plurality of refractive index perturbations are spaced along the fiber by a periodic distance $\Lambda'$ which is large compared to the wavelength $\lambda$ of the transmitted light. In contrast with conventional Bragg gratings, long-period gratings use a periodic spacing $\Lambda'$ which is typically at least 10 times larger than the transmitted wavelength, i.e. $\Lambda'\geq10\lambda$. Typically $\Lambda'$ is in the range 15–1500 micrometers, and the width of a perturbation is in the range $\frac{1}{5}\Lambda'$ to $\frac{4}{5}\Lambda'$. In some applications, such as chirped gratings, the spacing $\Lambda'$ can vary along the length of the grating.

Long-period fiber grating devices selectively remove light at specific wavelengths by mode conversion. In contrast with conventional Bragg gratings in which light is reflected and stays in the fiber core, long-period gratings remove light without reflection, as by converting it from a guided mode to a non-guided mode. (A non-guided mode is a mode which is not confined to the core, but rather, is defined by the entire waveguide structure. Often, the non-guided is a cladding mode). The spacing $\Lambda'$ of the perturbations is chosen to shift transmitted light in the region of a selected peak wavelength $\lambda_p$ into a nonguided mode, thereby reducing in intensity a band of light centered about $\lambda_p$. Alternatively, the spacing $\Lambda'$ can be chosen to shift light from one guided mode to a second guided mode (typically a higher order mode), which is substantially stripped off the fiber to provide a wavelength dependent loss. Such devices are particularly needed for equalizing amplifier gain at different wavelengths.

A shortcoming of conventional long-period gratings for amplifier gain equalization, however, is their limited ability to dynamically equalize gain. They filter only a fixed wavelength. Each long-period grating with a given periodicity ($\Lambda'$) selectively filters light in a narrow bandwidth centered around. $\lambda_p=(n_g-n_{ng})\cdot\Lambda'$, where $n_g$ and $n_{ng}$ are the effective indices of the core and the cladding modes, respectively. The value of $n_g$ is dependent on the core and cladding refractive index while $n_{ng}$ is dependent on core, cladding and air indices.

In the future, multi-wavelength communication systems will require dynamic reconfiguration and reallocation of wavelengths among the various nodes of a network depending on user requirements, e.g., with programmable add/drop elements. This reconfiguration will impact upon the gain of the optical amplifier. As the number of channels passing through the amplifier changes or the power changes, the amplifier will start showing deleterious peaks in its gain spectrum, requiring modification of the long-period grating used to flatten the amplifier. Modifying the long-period grating implies altering either the center wavelength of the transmission spectrum and/or the depth of the coupling.

Thus, there is a need for reconfigurable long-period gratings whose transmission spectra can be controlled as a function of the number of channels and power levels transmitted through an amplifier. It is desirable to have reconfigurable long-period gratings which, upon activation, can be made to dynamically filter other wavelengths (i.e., besides $\lambda_p$). It is also desirable to be able to selectively filter a broad range of wavelengths. Further, reconfigurable long period gratings would be useful for suppressing amplifier spontaneous emission (ASE), and could also be used for filtering out undesirable remnant signals from communication channel Add/Drop operations.

Diffraction gratings typically comprise reflective surfaces containing a large number of parallel etched lines of substantially equal spacing. Light reflected from the grating at a given angle has different spectral content dependent on the spacing. The spacing in conventional diffraction gratings, and hence the spectral content, is generally fixed. Thus diffraction gratings are also of limited reconfigurability.

In view of the foregoing, it can be seen that there is a need for programmable optical gratings including Bragg gratings, long-period gratings and diffraction gratings whose spacing can be latchably reconfigured.

SUMMARY OF THE INVENTION

The invention discloses digitally tunable optical grating devices using force between switchable and nonswitchable magnets to reconfigure the mechanical strain, preferably a tensile strain, on gratings so that a pulse or a short-duration electric current can induce a latchable change in grating periodicity. Preferred embodiments include fiber gratings with magnet gaps dimensioned for limiting the maximum strain applied and for providing strain without rotation or twisting. The magnets provide an accurately predetermined amount of strain and hence provide a latchable wavelength shift in the grating with a minimal amount of electrical power. The device is especially useful in WDM communication systems, particularly for adding or dropping optical channels and for dynamically equalizing amplifier gain.

BRIEF DESCRIPTION OF THE DRAWINGS

The advantages, nature and additional features of the invention will appear more fully upon consideration of the illustrative embodiments described in the accompanying drawings. In the drawings.

It is to be understood that these drawings are for purposes of illustrating the concepts of the invention and are not to scale. The same reference numerals are used to designate similar elements throughout the drawings.

DETAILED DESCRIPTION

Figure 1:
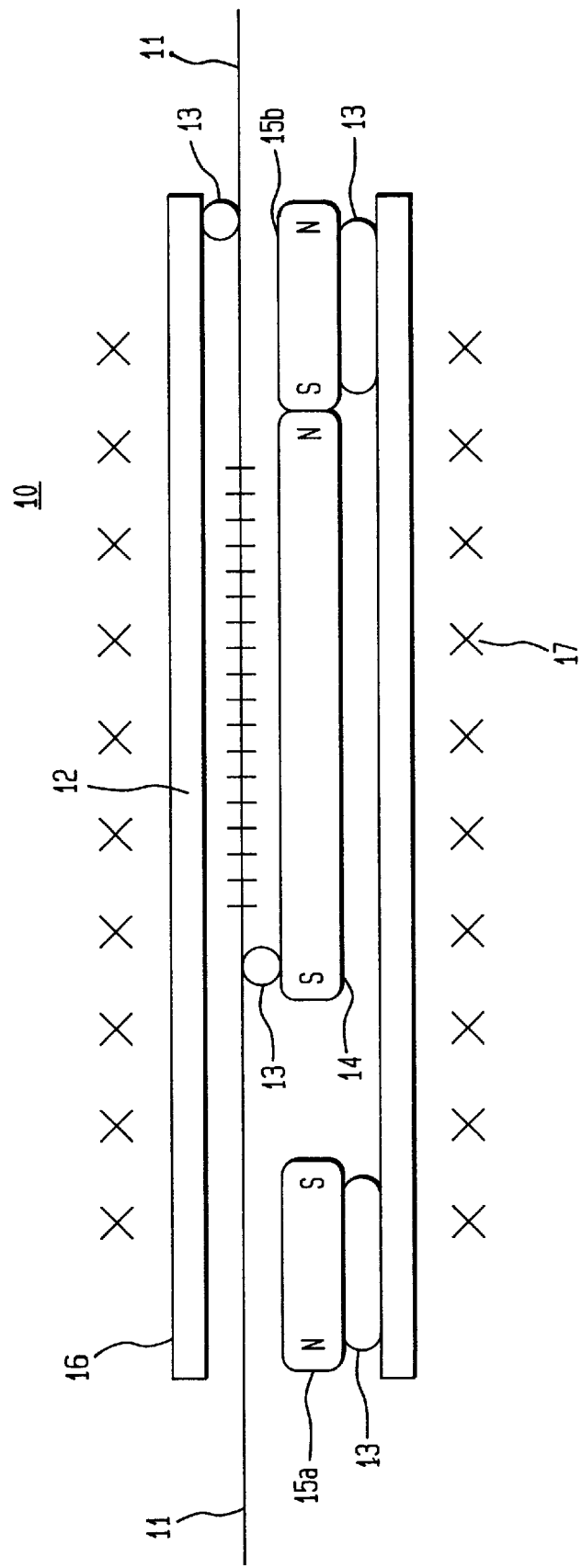
FIG. 1 schematically illustrates an exemplary, bistable, magnetically tunable fiber grating device.

Referring to the drawings, FIG. 1 schematically illustrates an exemplary digitally tunable fiber grating device 10 comprising a length of optical fiber 11 including a grating 12 of spaced grating elements (index perturbations). The fiber in the region of the grating is secured, as by bonds 13 or mechanical attachment, between a first magnet 14 and the guiding container 16 for transmitting magnetic force from the magnet 14 to the grating 12. The second and third magnets 15A, 15B are fixed in relation to the fiber as by bonding to container 16. At least one of the magnets, e.g., the first magnet, is switchable by a magnetic field. The second and third magnets provide attractive or repulsive force to the first magnet 14. The magnet 14 can have a circular cross section, but non-circular cross sections are preferred in order to minimize fiber twisting during handling or service. One or more electromagnets (solenoids) 17 are disposed adjacent the magnet 14 for providing a sufficient magnetic field to switch the polarity when desired. The guiding container 16 is preferably a tube but can also have other configurations, e.g., it can comprise a two-part assembly with u-shaped bottom and top pieces.

The guiding container 16 is typically a tube made of glass, quartz, metal or plastic. The fiber 11 is preferably attached to magnet 14 and the guiding container 16 either by bonds 13, such as epoxy, low melting point glass, or solder. In the use of solder, the fiber surface is desirably coated with a metal layer to improve solder bond strength. The switchable and mobile magnet 14, and the two nonswitchable and immobile magnets 15A, 15B are aligned with a small fixed (preset) gap between them. The two nonswitchable magnets 15A, 15B are preferably oriented so that like poles face each other (S toward S or N toward N) with the switchable magnet 14 placed between them.

In operation, magnet 14 is attracted and latched to either the left-side nonswitchable magnet 15A or the right-side nonswitchable magnet 15B depending on the polarity of magnetization by the surrounding solenoid 17. By virtue of the magnetic pole arrangement, the switchable magnet is repelled by one of the nonswitchable magnets e.g. 15A while attracted to the other 15B. Since there are only two fixed positions of the mobile magnets, there are only two fixed states of tensile strain and hence two grating wavelength states in the attached optical fiber grating. The preset gap between the fixed magnets and the mobile magnet determines the extent of shift in the grating wavelength in this bistable (digitally tunable) device.

An important advantage of the device illustrated in FIG. 1 is the latchability of the shifted wavelength. After a pulse or short-duration current to the solenoid is applied for actuation, the mobile magnet is latched to one of the two positions and the electrical power is no longer needed.

The force transmitted from the magnet 14 to the grating 12 produces a strain which changes the wavelength response of the grating. The force between two attracting magnets is approximately proportional to the square of the magnetic induction (M) multiplied by the cross-sectional area (A) of the magnets at the gap (F $\propto$ M$^2 \cdot$A). Thus stronger magnets (higher M) or larger magnets (larger A) give stronger force. However, strong magnets with high coercivity are difficult to magnetically switch. When the fiber grating is stretched or compressed, e.g., 1% in length ($\epsilon = \Delta l/l = 0.01$), the grating periodicity $\Lambda$ will also change. The resonating Bragg reflection wavelength $\lambda$ will not change by exactly 1%, since the refractive index n is also affected by the elastic strain. This strain effect on the refractive index can be represented by a photoelastic constant $P_\epsilon$ which is typically about 0.22 for the SiO$_2$ fiber. The wavelength shift induced by the magnetically applied strain $\epsilon$ ($\epsilon = \Delta l/l$) is thus expressed as $\Delta \lambda / \lambda = (\Delta l/l)(1-P_\epsilon) = \epsilon(1-P_\epsilon)$. The strain $\epsilon$ is determined by the applied stress ($\sigma$) and the elastic modulus (E), $\epsilon = \sigma/E$, and the stress on the fiber is the force (F) divided by the cross-sectional area ($\pi r^2$) where r is the radius of the fiber grating.

Since optical fiber tends to fracture or break at a tensile strain approaching about 6%, and since such a failure would be disastrous, it is highly desirable to have a tunable grating design that automatically provides an upper limit in total tensile strain. The FIG. 1 configuration offers such an advantage because the pre-set gap between the magnets serves as the upper limit for tensile elongation of the fiber. The desired length of the gap between the magnets (the upper limit in fiber elongation) is typically less than 4% of the fiber length being stretched (e.g., for 2" long fiber containing the grating, the gap is set below ~80 mil), and preferably less than 1% of the length of the grating-containing fiber.

Figure 2A:
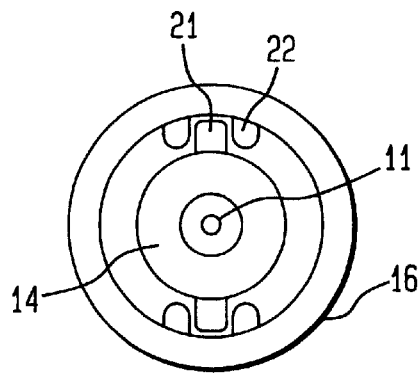
FIGS. 2(a)–(e) schematically illustrate exemplary cross-sectional shapes of the switchable magnet and the guiding rail structure for use in the tunable grating assembly.
Figure 2B:
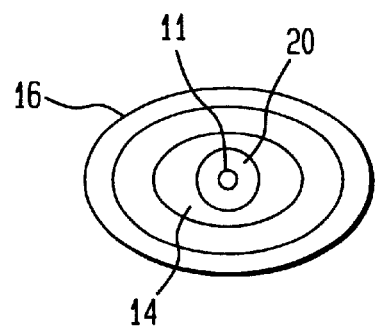
Figure 2C:
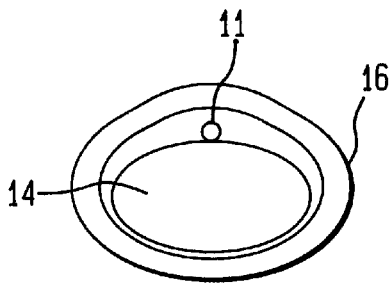
Figure 2D:
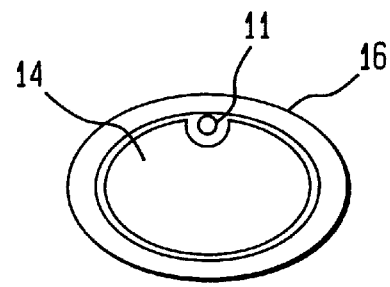
Figure 2E:
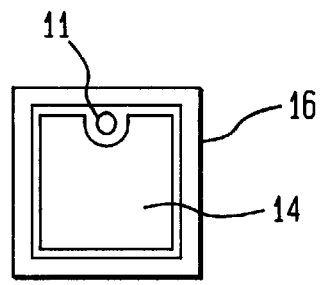

It is also important that the fiber grating is not subjected to a torsional deformation, as torsion alters the amount of strain applied to the grating, reduces the fiber breaking strength for a given tensile strain, and may distort optical signals. FIGS. 2(a)–2(e) illustrate various guiding mechanisms to eliminate or reduce torsional deformation. FIG. 2(a) shows how guide rails 22 can be added to a circular sectioned tube 16 to cooperate with tabs 21 on magnet 14 for preventing torsion. FIGS. 2(b)–2(e) show guidance can be provided by non-circular tubes. The fiber 11 can be located within a hole 20 in magnet 14 as shown in FIGS. 2(a) and 2(b) or within a groove 21 as shown in FIGS. 2(d) and 2(e).

Figure 3A:
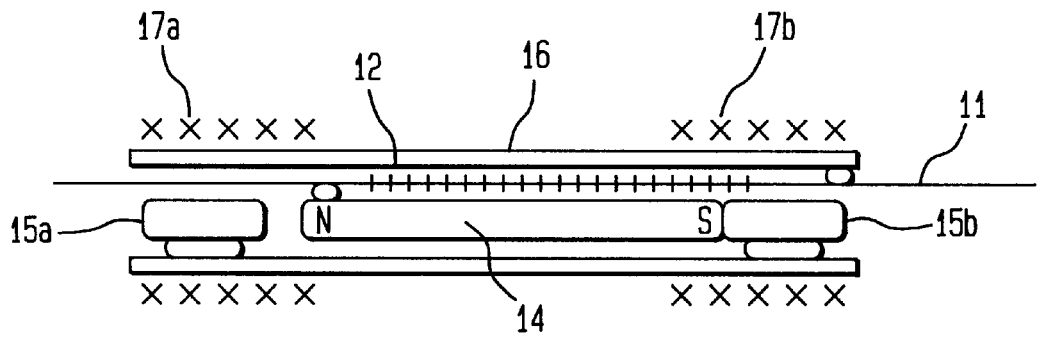
FIGS. 3(a)–(c) schematically show alternative bistable grating device configurations.
Figure 3B:
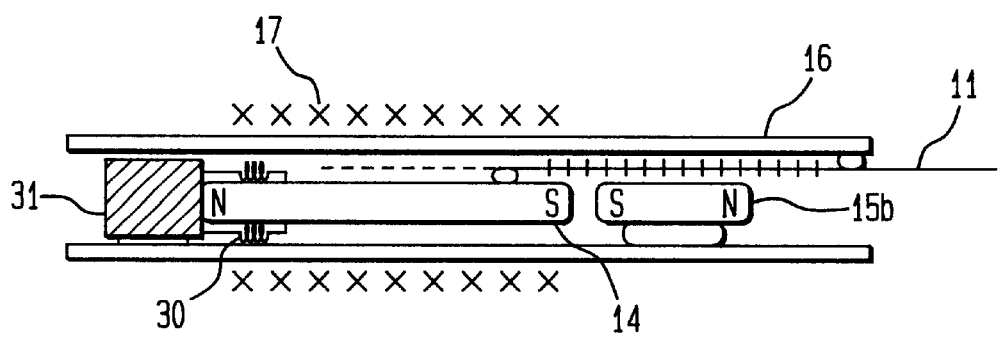
Figure 3C:
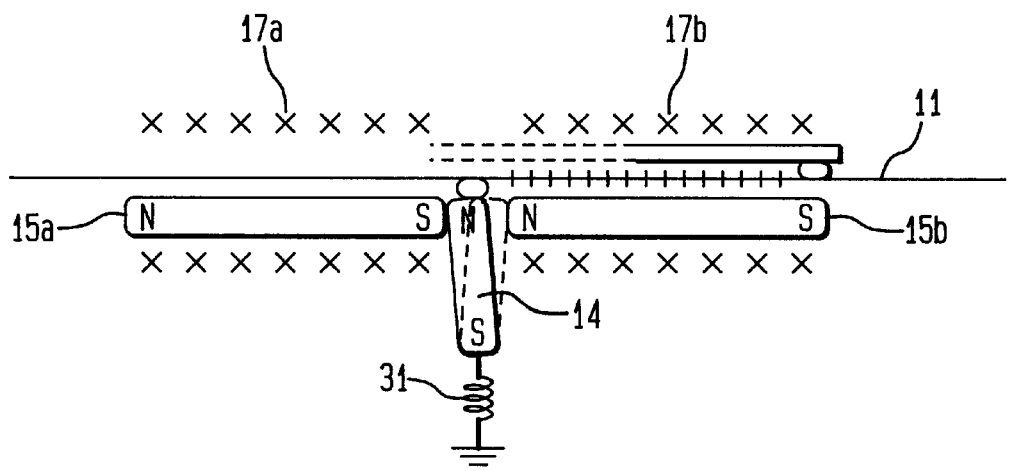

FIGS. 3(a)–3(c) illustrate various alternative forms of the magnetically switchable grating device. In FIG. 3(a), the switchable magnets (magnetically soft or semi-hard) are the magnets 15A and 15B fixed in position and the mobile magnet 14 is nonswitchable Two separate solenoids 17A and 17B are utilized to selectively actuate (magnetize) either switchable magnet 15A or magnetize the switchable magnet 15B. Since the solenoids 17A, 17B are off-center relative to magnet 14, there is an additional attractive force to pull magnet 14 toward the actuated solenoid.

In the FIG. 3(b) configuration a mechanical spring 30 attached to a support 31 replaces one of the fixed magnets. If the solenoid 17 is not actuated (or is actuated in such a way to either de-magnetize or reverse-magnetize the switchable mobile magnet 14 to be repelled away from the nonswitchable magnet 15B), the spring force pulling the mobile magnet is sufficient to latch it to the left-side position. If the solenoid 17 is actuated to magnetize the switchable magnet so that the induced magnetic poles are attractive to the nonswitchable magnet 15B, the mobile magnet 14 will be pulled and latched to the right-side, giving rise to a digitally shifted wavelength in the attached fiber grating. The positions of the switchable magnet 14 vs nonswitchable magnet 15B can optionally be interchanged, with the solenoid location adjusted to be near the switchable magnet.

In the FIG. 3(c) configuration, mobile magnet 14 is mounted for tilting or rotational movement. The tensile elongation of the fiber grating is produced by tilting or rotation movement of magnet 14 instead of linear, axial movement. The end (bottom-side) of the nonswitchable magnet 14 is attached to a fixed position by a mechanical spring 31 or compliant fixture.

Figure 4:
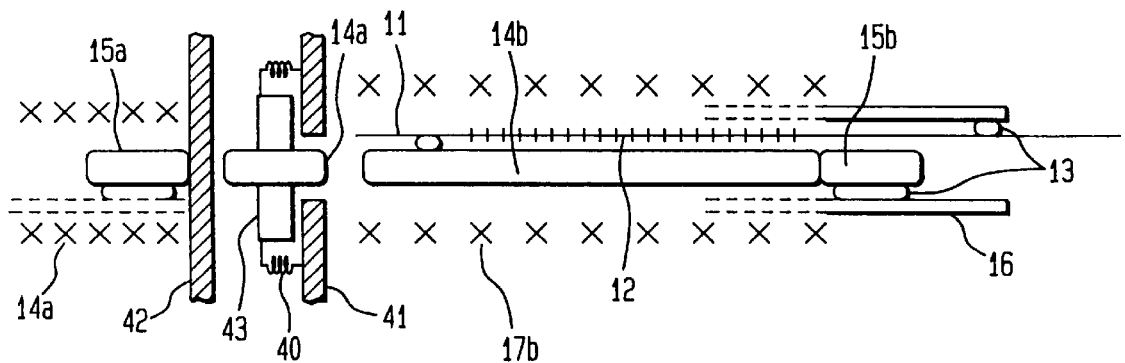
FIG. 4 represents a schematic illustration of a multiple state, digitally tunable grating device.

The digitally tunable gratings are not restricted to bistable devices. Tri-stable or higher order digital tuning is possible. FIG. 4 schematically illustrates a device with three stable states. Here, four separate magnets are involved. The magnet 15B is a fixed (immobile), nonswitchable permanent magnet. The magnet 14B is a mobile and switchable (magnetizable) magnet onto which one end of the fiber 11 is attached. The magnet 14A is a mobile but nonswitchable magnet which is supported by mechanical spring(s) 40. The magnet 15A is a fixed, switchable magnet. If the magnet 14A is magnetically-pushed (and/or spring-pulled) to the right to rest on the stop 41, the mobile magnet 14B operates as a bistable, digitally tunable device similar to the device of FIG. 1. However, if the magnet 14B is magnetically attracted to the magnet 15B by suitably magnetizing it to the correct polarity, the magnet 14A will now rest on the stop 41, creating a third, digitally tunable position. As the mobile magnet 14B is actuated and latched onto the magnet 14A, the attached fiber grating 12 is further stretched as compared to the case when the magnet 14A rests on the stop 42. The difference in the travel distance of the magnet 14B in the above two cases is accurately controlled by precision machining or placement of the parts so that the desired third tuned state is obtained. The magnetic attractive or repulsive force between the actuated magnet 14A and magnet 15A is designed to be substantially larger than the retaining force of the spring(s) 40 supporting the magnet 14A. If a similar structure is repeated on the righthand side of the FIG. 4 device, a four-state digitally tunable grating device can be constructed. Even higher number of digitally tunable states can be obtained by repeatedly adding similar structures.

Figure 5:
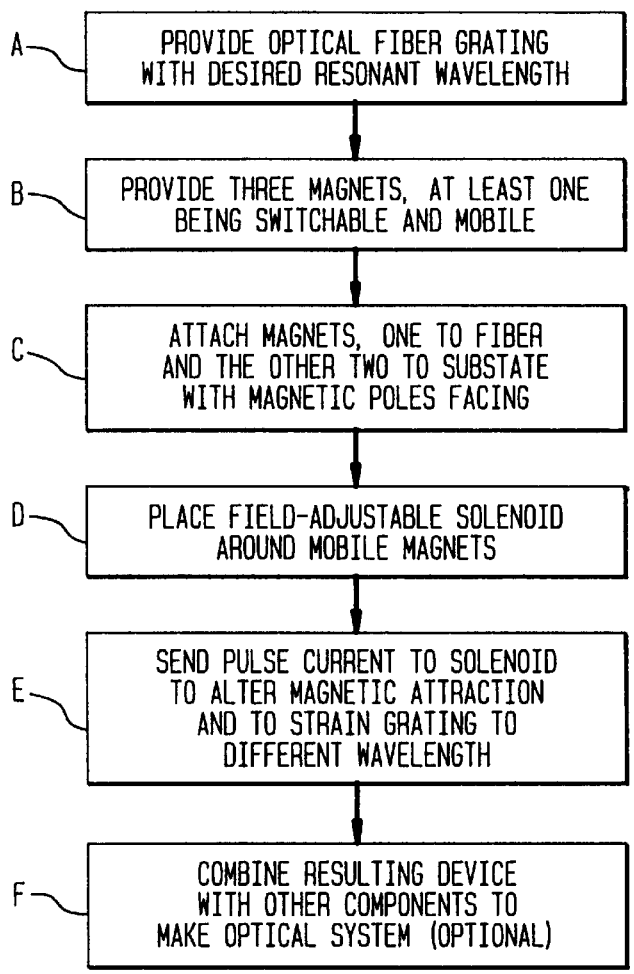
FIG. 5 is a flow diagram illustrating the exemplary steps for making a tunable and latchable grating.

FIG. 5 is an exemplary flow diagram illustrating the steps in the preferred process for making the bistable tunable optical fiber grating of FIG. 1. The first step shown in block A is to provide an optical fiber grating, e.g., a Bragg grating having a desired Bragg reflection wavelength for dropping or adding a wavelength component, or a long period grating with a periodicity for desired peak wavelength of coupling. For example, for a median light beam wavelength of 1550 nm, the Bragg grating periodicity $\Lambda$ in a SiO$_2$ based fiber (with a refractive index n~1.45) is about 500 nm. The length of each optical fiber grating to be incorporated into the grating assembly is typically in the range of 5 mm to 200 mm and preferably in the range of 10–100 mm. For the short fiber grating, the region of the regular fiber outside the grating can be used for attachment to either the magnetic components or the guiding container (or a substrate).

The next step shown as block B is to provide magnetic components and a guiding container to be attached to the fiber grating. At least three magnetic components, each either a single piece or an aggregate, are needed. They are oriented with their magnetic poles preferably parallel to the axis of the fiber grating. In the exemplary tunable grating, at least a portion of the mobile magnetic component (the middle magnet) should be magnetically soft or preferably semi-hard with a remanent magnetization. The polarity of at least a portion of the mobile magnet should be switchable by altering the polarity of the applied magnetic field. The two immobile and nonswitchable magnets have preferably the same magnetic poles facing each other, e.g., the north against the north pole. The immobile magnets are bonded onto the guiding container, e.g., by epoxying, soldering, welding, screwing, etc.

The third step (block C of FIG. 5) is to align and attach the grating to the mobile magnet and the guiding container. The magnet can desirably have one of the various exemplary configurations shown in FIGS. 2(a)–2(e). To assure a strong bonding and minimize strain relaxation at the bond interface, the use of mechanically strong, non-thermoplastic adhesive, fusable glass adhesive, or a solder with a relatively high melting point, high mechanical strength and high creep resistance is desired. The fiber surface to be attached is desirably coated with a metallization layer to improve the solder bond strength. For ensuring the accuracy of the wavelength shift upon switching, the air gap between the facing poles should be tightly controlled, e.g., by precision machining of various components involved.

The preferred materials for the switchable magnet are those whose magnetic properties are modifiable by a pulse magnetic field. They can be magnetically soft materials with very low coercivity (e.g., below ~10 Oe) such as Ni—Fe based permalloys, Fr—Co based permendur type alloys, or Si-steels. For the ease of clicking and unclicking to or from the nonswitchable magnets, semi-hard magnetic materials are preferred, for example, low-coercivity (e.g. below ~200 Oe) Fe—Cr—Co, Fe—Al—Ni—Co (Alnico), Cu—Ni—Fe (Cunife), Co—Fe—V (Vicalloy), Fe—Mn, Fe—Mn—Ni, Fe—Mo—Ni. While less preferably, the use of specially-processed, low-coercivity ($H_c$) rare earth cobalt (Sm—Co) or Nd—Fe—B magnets, and Ba-ferrite or Sr-ferrite magnets is not excluded. The desired range of the coercivity for the semi-hard magnet is typically below 500 Oe and preferably below 100 Oe for the ease of polarity switching using solenoid pulse field. The coercivity is typically above 10 Oe and preferably above 30 Oe for maintaining the stability of the remanent magnetization and also for stability against demagnetization due to stray magnetic fields. For the semi-hard magnetic materials it is desirable that the switchable magnet have a relatively square magnetization hysteresis loop with the squareness ratio (remanent magnetization/saturation magnetization) of at least 0.85, preferably at least 0.90, even more preferably at least 0.95. Mechanically ductile and easily formable or machineable magnet alloys such as Fe—Cr—Co, Cu—Ni—Fe, Co—Fe—V are particularly desirable for shaping the desired rod-like geometry shown in FIG. 2. Stable permanent magnets with high coercive forces (e.g., $H_c$>1000 Oe), such as Sm—Co, Nd—Fe—B or Ba-ferrite are less desirable as the switchable magnet (unless modified to exhibit lower coercive forces) because of the difficulty in switching using desirably low magnetic fields. These stable magnets, however, are suitable as nonswitchable magnets placed at both ends of the FIG. 1 device. Their high coercivity keeps them from getting affected by the actuating magnetic field.

The next two steps in FIG. 5 (Blocks D and E) are to add at least one solenoid winding around the mobile magnetic component and to apply a programmed pulse or a short-duration field to switch the polarity and alter the direction of magnet clicking. This adjustment alters the force and the strain on the fiber grating, and hence grating wavelength (or amplitude in the case of long period grating). The desired duration or speed of the pulse field is typically in the range of $10$–$10^{-6}$ seconds and preferably $10^{-1}$–$10^{-4}$ seconds. For a thick magnet geometry, the use of pulses that are too fast is not desirable because of the eddy current loss. The shape of the current pulse can be rectangular, rectified sinusoidal or irregular as long as the maximum field needed for the desired magnetic switching is accomplished.

The last step in FIG. 5 (Step F), which is optional, is to combine a multiplicity of the magnetically bistable tunable and latchable gratings with circulators and other optical components, and carry out the wavelength-division-multiplexed fiber optic telecommunications.

EXAMPLE 1

A bistable, tunable optical fiber grating device was assembled to the FIG. 1 configuration as follows. The Bragg reflection wavelength was 1556.480 nm. An alloy rod Fe-28 wt % Cr-7 wt % Co, (0.095 inch diameter) was fabricated by deformation aging to exhibit a square magnetic hysteresis loop with $H_c$~93 Oe and a squareness ratio $M_r/M_s$ of ~0.97. The used as the mobile, switchable magnet 14 in FIG. 1. The length of the magnet rod was about 2 inches. Non-switchable magnets (two Nd—Fe—B magnets with 0.25 inch long and 0.125 inch diameter) were attached to each end of the stainless steel guiding tube. One end of the fiber grating was epoxy-bonded to the left-hand side end of the switchable magnet 14 while the other end of the grating was bonded to the stainless steel tube 16 as illustrated schematically in FIG. 1. This assembly was placed in a solenoid and electrical current was passed to apply a magnetic field and then removed in order to switch the polarity of the remanent magnetization in the Fe—Cr—Co switchable magnet 14, so that it latches to either the left hand side Nd—Fe—B permanent magnet 15A or the right hand side Nd—Fe—B magnet 15B.

Figure 6:
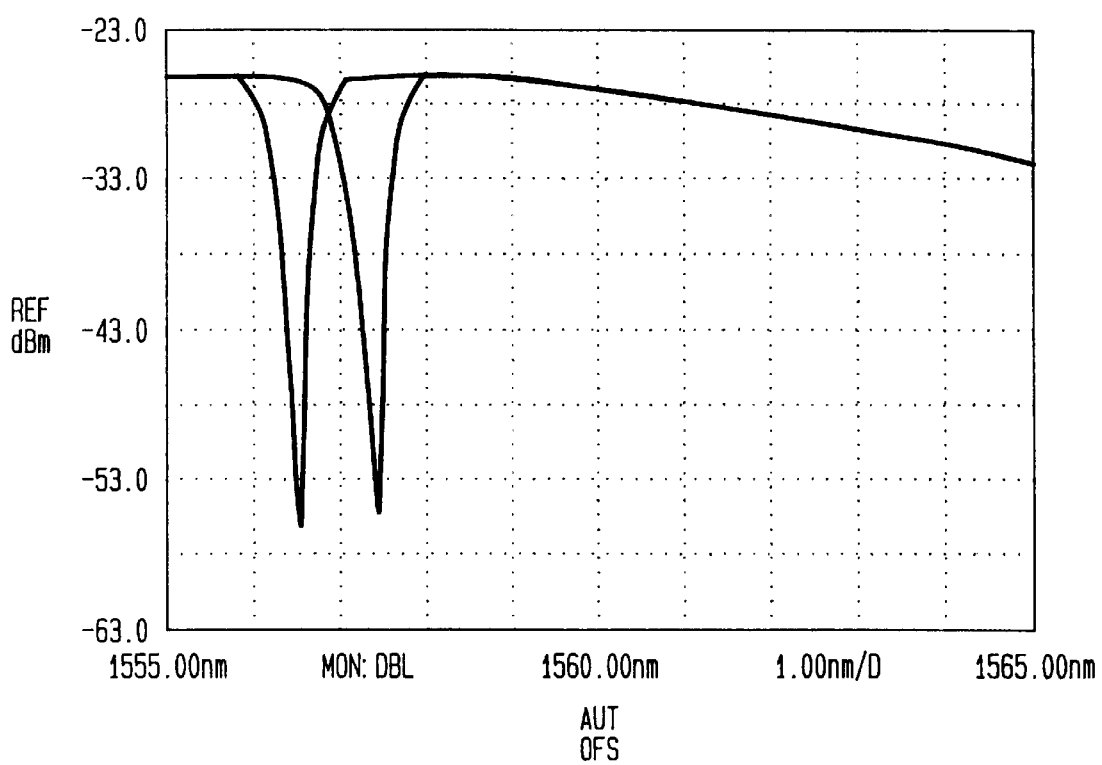
FIG. 6 shows experimental data on wavelength shift induced by magnetic pulse switching in an exemplary bistable grating device.

FIG. 6 is a graphical illustration showing the wavelength shift experimentally obtained by an applied field of ±200 Oe (supplied by ~1 millisecond pulse current in the solenoid) in the bistable grating device described above. When the Fe—Cr—Co magnet 14 was latched (clicked) to the left permanent magnet 15A, the wavelength of the fiber grating was 1557.420 nm while it was altered to 1556.480 nm when the magnet was switched and made to click to the right permanent magnet 15B. The wavelength shift of $\Delta\lambda$=0.940 nm was reproducible upon switching many times.

The bistable tunable grating devices according to the invention have several advantages. The induced wavelength shift is latchable after the applied field is removed, and hence no continuous power consumption is needed to maintain the wavelength shift. The device structure is relatively simple, and the electrical current (or voltage) applied to the solenoid for switching actuation is not critical in that one need only to apply a current (or voltage) greater than a certain minimum value for switching operation to take place. The speed of wavelength shift (or channel add/drop) can be relatively fast, e.g., faster than 10 milliseconds.

The gratings described herein are especially useful in wavelength division multiplexed communication systems which employ multiplexer/demultiplexer devices. In such systems, a "trunk" fiber carries optical signal channels at several wavelengths $\lambda_1, \lambda_2, \ldots \lambda_n$ and it is desirable to extract one or more wavelength channels from the trunk fiber or to add one or more wavelength channels onto the trunk fiber. A wide variety of such devices can be made by interconnecting optical circulators and fiber gratings. Typically the channel reflected by the grating is dropped from the trunk fiber or is added to the trunk fiber. The gratings described herein permit selection of which channel is dropped or added.

Figure 7:
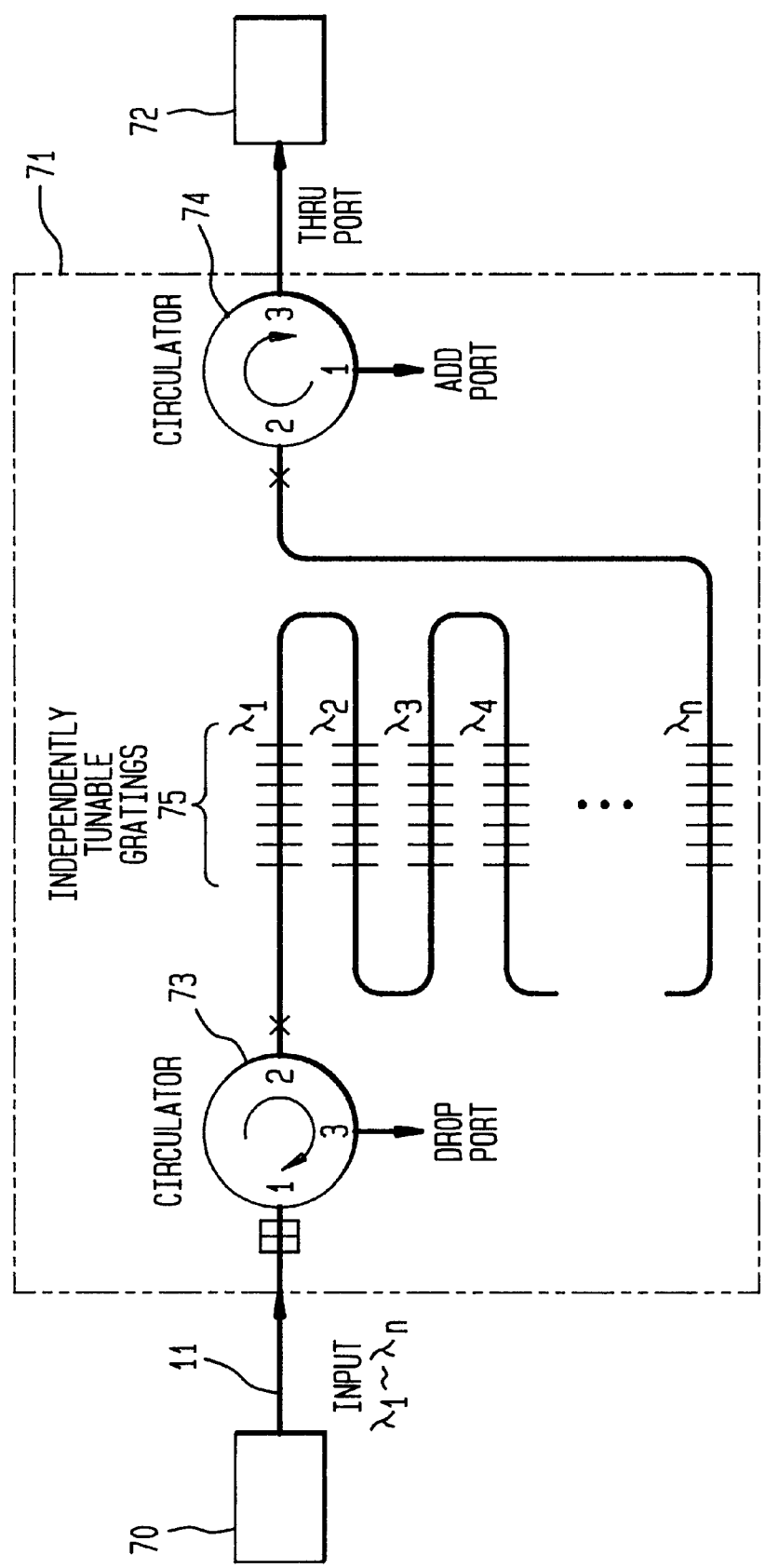
FIG. 7 shows an N channel add/drop WDM communication system.

FIG. 7 schematically illustrates a wavelength division multiplexed (WDM) communications system comprising a multiple-channel transmitter 70, a magnetically tunable N-channel ADD/DROP multiplexer/demultiplexer 71 and a receiver 72, all connected by trunk fiber 11. The input on fiber 11 consists of optical signals at several wavelengths, $\lambda_1$ to $\lambda_n$.

The improved multiplexer 71 comprises one or more pairs (here 1 pair) of circulators, comprising an upstream circulator 73 and a downstream circulator 74. A series of bistable tunable gratings 75 are placed between the circulators, with their grating wavelengths located at between-channel wavelengths. For such a system with equally spaced optical channels at $\Delta\lambda$ (for example 0.4 nm or 0.8 nm), the grating wavelengths are set at $\lambda_n=\lambda_1+(2n-1)\Delta\lambda/2$. Actuation of desired grating for one-half channel shift in wavelength drops or adds the adjacent communication channel.

EXAMPLE 2

A 32-channel, reconfigurable ADD/DROP system for wavelength division multiplexing is constructed using 32 magnetically tunable, bistable fiber gratings connected in a series with associated circulators or directional couplers to serve as ADD or DROP ports as schematically illustrated in FIG. 7.

The nominal (mean) wavelength of the optical signal to be processed is 1550 nm, and the signal wavelength channels are separated from one another by a spacing of 0.8 nm producing a center-to-center spacing with a channel width of 0.3 nm. The refractive index periodicity ($\Lambda$) of each grating is made into a predetermined dimension so that all 32 gratings have their Bragg reflection wavelengths off by a half channel (placed at the mid-channel positions), and hence with no tuning activated, all 32 wavelength signals pass through the ADD/DROP system without being filtered (dropped). If a certain selected group of channels (e.g., Channels #1, #5, and #27) needs to be dropped (or filtered), the magnetic tuning devices for those gratings are activated by a magnetic pulse field so as to strain the fiber gratings by ½ channel, e.g., $\Delta\lambda/\lambda$ of roughly 0.4 nm/1550 nm≈0.025%. To cancel the DROP operation of a channel, e.g. channel #3, reverse-polarity magnetic field (or a demagnetizing field) is applied to the magnet element to switch (click) to the other permanent magnet and shift back the wavelength by ½ channel. The ADD operation is performed in a similar manner (e.g. for channels #4, #9, #14 and #23) but with a backward transmission through a circulator and Bragg reflection in the forward direction.

The magnetically switchable fiber grating assembly provides advantages for a variety of optical fiber communication devices and communication operation systems. For example, a chirped Bragg grating (e.g., with a gradient periodicity covering $\lambda_1$ through $\lambda_4$ along the length of one grating, or with the four distinct grating structures written in series in one grating length) can be made magnetically switchable between two strain positions, according to the invention. In this case, the four channels are dropped or added simultaneously as a group. A plurality of chirped gratings can be connected so that the group-wise add/drop operation of channels can be performed covering a wider bandwidth.

Figure 8:
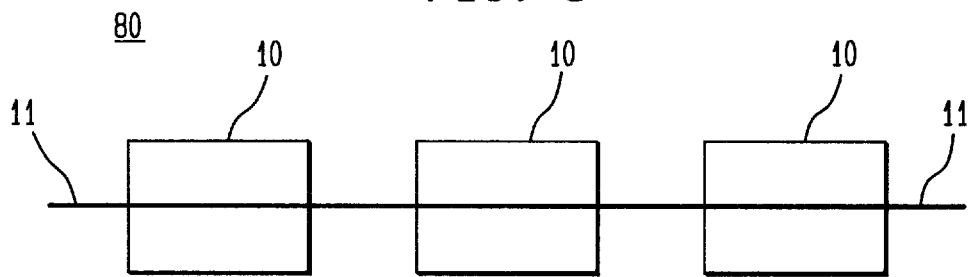
FIG. 8 schematically illustrates a wide band tunable loss filter.

The bistable tunable grating structure can also be applied to the long-period gratings for gain adjustment. As schematically illustrated in FIG. 8 a tunable loss filter 80 covering a wider bandwidth than a single long-period grating device can be constructed by concatenating magnetically switchable long-period gratings 10 along a single fiber 11. A desired loss spectrum can be obtained by selectively activating the gratings with wavelength shifts.

Figure 9:
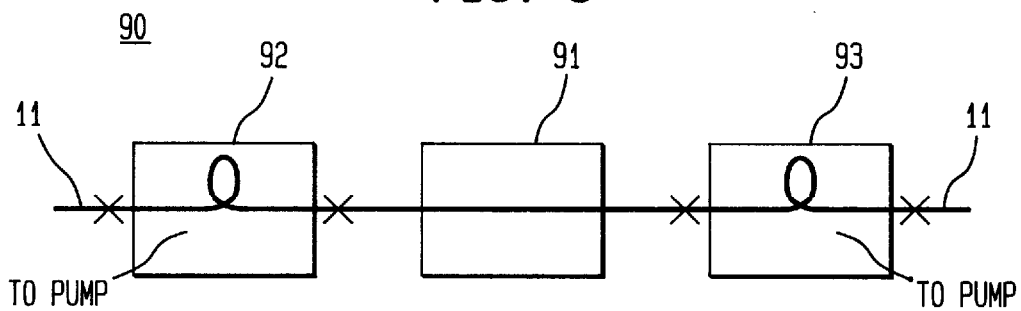
FIG. 9 shows a dynamically gain-flattened optical amplifier.

FIG. 9 illustrates a dynamically gain-flattened amplifier 90 made by including a tunable loss filter 91 composed of the tunable long-period gratings in a rare earth doped amplifier (such as an erbium-doped fiber amplifier). The amplifier 90 preferably comprises a plurality of rare-earth fiber amplifier stages (e.g. two stages 92 and 93) with the tunable loss filter 91 preferably disposed at the output of the first stage 92. For applications where noise is less important, the filter 91 can be placed in front of the first stage 92. For applications where power is less important, it can be placed at the output of the last stage 93. Long-period gratings for flattening the response of an amplifier are described, for example, in U.S. Pat. No. 5,430,817 issued to A. M. Vengsarkar on Jul. 4, 1995, which is incorporated herein by reference. Such devices 90 can be advantageously used in WDM optical communication systems to ensure equalized amplification.

Figure 10:
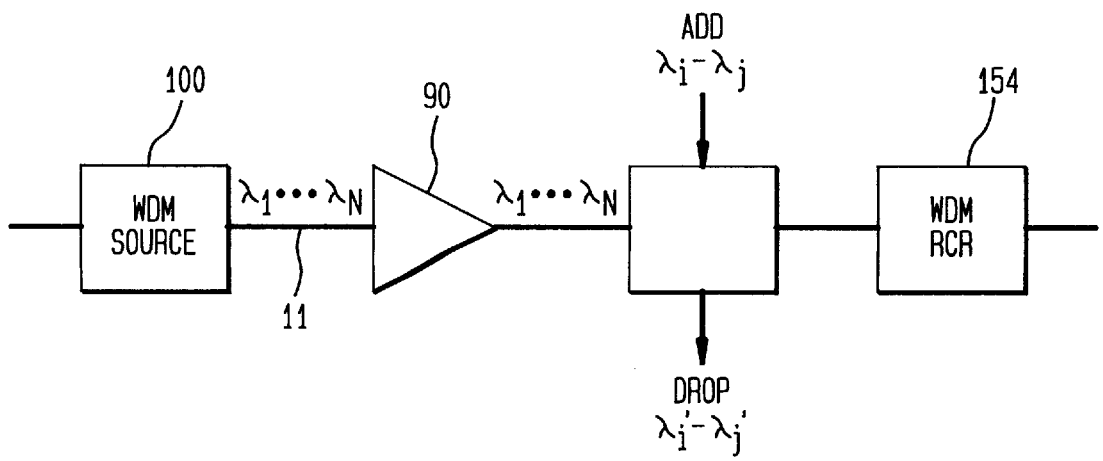
FIG. 10 schematically illustrates an optical WDM communication system which can employ the amplifier of FIG. 9.

If FIG. 10 schematically illustrates an optical WDM communication system comprising a source 100 of modulated WDM optical signal channels $\lambda_1, \lambda_2, \ldots \lambda_n$ along a trunk fiber 11. The channels pass through one or more gain equalized amplifiers 90, which can be gain flattened amplifiers as shown in FIG. 9, and through one or more ADD/DROP devices 71, which can be ADD/DROP devices 71 as shown in FIG. 7.

It is to be understood that the above-described embodiments are illustrative of only a few of the many possible specific embodiments which can represent applications of the invention. The magnetically switchable and latchable device concept, assembly and operation method described here are also useful for making various other types of non-fiber optical gratings for the purpose of reconfiguring or tuning either wavelength, amplitude or phase of optical information. For example, slitted gratings, transmission-type or reflection-type grooved gratings, or phase gratings can be made magnetically tunable, according to the invention, for various optical applications such as for producing fresnel lenses, holographic images, and optical memory devices. Numerous and varied other arrangements can be made by those skilled in the art without departing from the spirit and scope of the invention.

What is claimed:

1. A tunable optical grating device comprising:
   an optical grating comprising a length of optical fiber having a plurality of spaced optical grating elements along the fiber:
   a first magnet attached to said grating body, and at least second and third magnets fixed in relation to said grating, said second and third magnets spaced apart by a gap, said first magnet capable of movement between said second magnet and said third magnet by stressing said fiber, the extent of the movement of said first magnet determined by said gap,
   and at least one of said magnets being switchable in response to an applied magnetic field whereby said first magnet is latchably switched between said second and third magnets, thereby switching said grating between two strain states; and
   a guide to limit twisting of said fiber.

2. A device according to claim 1 wherein said guide comprises a tube of non-circular cross section for limiting rotation of said magnet.

3. An optical multiplexer/demultiplexer comprising at least one tunable grating device comprising:

an optical grating comprising a body having a plurality of spaced optical grating elements along a length of the body;

a first magnet attached to said grating body, and at least second and third magnets fixed in relation to said grating body, said second and third magnets spaced apart by a gap, said first magnet capable of movement between said second magnet and said third magnet by stressing said body, the extent of the movement of said first magnet determined by said gap, and at least one of said magnets being switchable in response to an applied magnetic field whereby said first magnet is latchably switched between said second and third magnets, thereby switching said grating between two strain states.

4. In a wavelength division multiplexed optical communications system comprising a source of multiple wavelength optical signal channels, an optical trunk fiber for transmitting signals from said source, and a multiplexer/demultiplexer for adding and or dropping channels from said signals, the improvement wherein said multiplexer/demultiplexer comprises a multiplexer/demultiplexer according to claim 3.

5. In an N-channel optical ADD/DROP multiplexer/demultiplexer comprising a plurality of optical circulators and a plurality of optical fiber gratings interconnected by an optical fiber for adding and/or dropping optical communications channels from said fiber, the improvement wherein at least one said optical grating is a tunable grating comprising:

an optical grating comprising a body having a plurality of spaced optical grating elements along a length of the body;

a first magnet attached to said grating body, and at least second and third magnets fixed in relation to said grating body, said second and third magnets spaced apart by a gap, said first magnet capable of movement between said second magnet and said third magnet by stressing said body, the extent of the movement of said first magnet determined by said gap, and at least one of said magnets being switchable in response to an applied magnetic field whereby said first magnet is latchably switched between said second and third magnets, thereby switching said grating between two strain states.

6. In a dynamically gain-flattened optical amplifier comprising a rare-earth doped optical fiber amplifier and one or more long-period gratings, the improvement wherein at least one said long-period gratings comprises:

an optical fiber long period grating comprising an optical fiber having a plurality of spaced optical grating elements along its length;

a first magnet attached to said grating, and at least second and third magnets fixed in relation to said grating, said second and third magnets spaced apart by a gap, said first magnet capable of movement between said second magnet and said third magnet by stressing said fiber, the extent of the movement of said first magnet determined by said gap, and at least one of said magnets being switchable in response to an applied magnetic field whereby said first magnet is latchably switched between said second and third magnets, thereby switching said grating between two strain states.

7. A tunable optical grating device comprising:

an optical grating comprising a body having a plurality of spaced optical grating elements along a length of the body;

a first magnet attached to said grating body, and at least second and third magnets fixed in relation to said grating body, said second and third magnets spaced apart by a gap, said first magnet capable of movement between said second magnet and said third magnet by stressing said body, the extent of the movement of said first magnet determined by said gap, and at least one of said magnets being switchable in response to an applied magnetic field whereby said first magnet is latchably switched between said second and third magnets, thereby switching said grating between two strain states;

wherein said spaced optical grating elements are chirped to broaden the bandwith.

8. A tunable optical grating device comprising:

an optical grating comprising a body having a plurality of spaced optical grating elements along a length of the body;

a first magnet attached to said grating body, and at least second and third magnets fixed in relation to said grating body, said second and third magnets spaced apart by a gap, said first magnet capable of movement between said second magnet and said third magnet by stressing said body, the extent of the movement of said first magnet determined by said gap, and at least one of said magnets being switchable in response to an applied magnetic field whereby said first magnet is latchably switched between said second and third magnets, thereby switching said grating between two strain states;

wherein said first magnet has two ends, a first end attached to said grating body and the second end resiliently mounted so that said first end can move between said second and third magnets.

9. A tunable optical grating device comprising:

an optical grating comprising a body having a plurality of spaced optical grating elements along a length of the body;

a first magnet having two ends, a first end attached to said grating body and the second end resiliently mounted; and at least a second magnet fixed in relation to said grating body, said first magnet capable of movement by stressing said resilient mount, the extent of the movement of said first magnet predetermined by the location of said second magnet;

and at least one of said magnets being switchable in response to an applied magnetic field whereby said first magnet is switched between latching to said second magnet and repulsion from said second magnet.

* * * * *